United States Patent
Mermillod

[11] 3,910,502
[45] Oct. 7, 1975

[54] COMPRESSED AIR GUN

[75] Inventor: Claude Mermillod, Faverges, France

[73] Assignee: Ste Anonyme des Ets Staubli, Faverges, France

[22] Filed: Aug. 23, 1974

[21] Appl. No.: 500,183

[30] Foreign Application Priority Data
Sept. 6, 1973 France .............................. 73.32700

[52] U.S. Cl. ............... 239/531; 239/587; 239/602; 239/DIG. 19; 285/264; 285/304
[51] Int. Cl.² ..................... B05B 15/08; F16L 27/00; F16L 37/02
[58] Field of Search ........... 239/270, 301, 525, 531, 239/587, 602, 392–395, 397, 526, 527, 528, DIG. 19; 285/160, 260, 261, 264, 304

[56] References Cited
UNITED STATES PATENTS

| | | | |
|---|---|---|---|
| 683,312 | 9/1901 | Marquardt | 285/261 |
| 1,923,425 | 8/1933 | Diederich | 239/587 |
| 2,052,362 | 8/1936 | Roselund | 239/587 X |
| 2,195,811 | 4/1940 | Bramsen et al. | 239/587 X |
| 2,288,101 | 6/1942 | Mayer | 239/587 X |
| 2,557,593 | 6/1951 | Björkman | 239/528 |
| 2,734,776 | 2/1956 | Elliott | 239/531 X |
| 3,067,955 | 12/1962 | Heath | 239/587 |
| 3,094,283 | 6/1963 | Balister | 239/393 |

Primary Examiner—Robert S. Ward, Jr.
Assistant Examiner—Andres Kashnikow
Attorney, Agent, or Firm—Dowell & Dowell

[57] ABSTRACT

A compressed air gun comprising a body which also serves as a handle having an inclined surface. A nozzle support member pivotally connected to the body at said inclined surface and by rotating the support member, the nozzle carried thereby can be differently orientated relative to the body.

5 Claims, 3 Drawing Figures

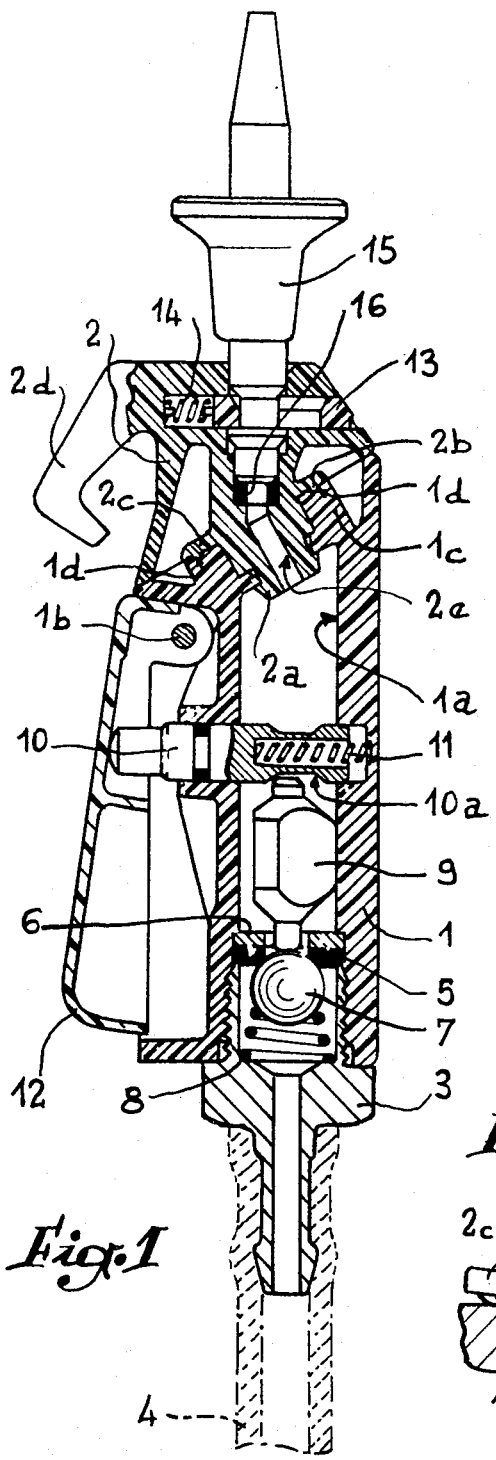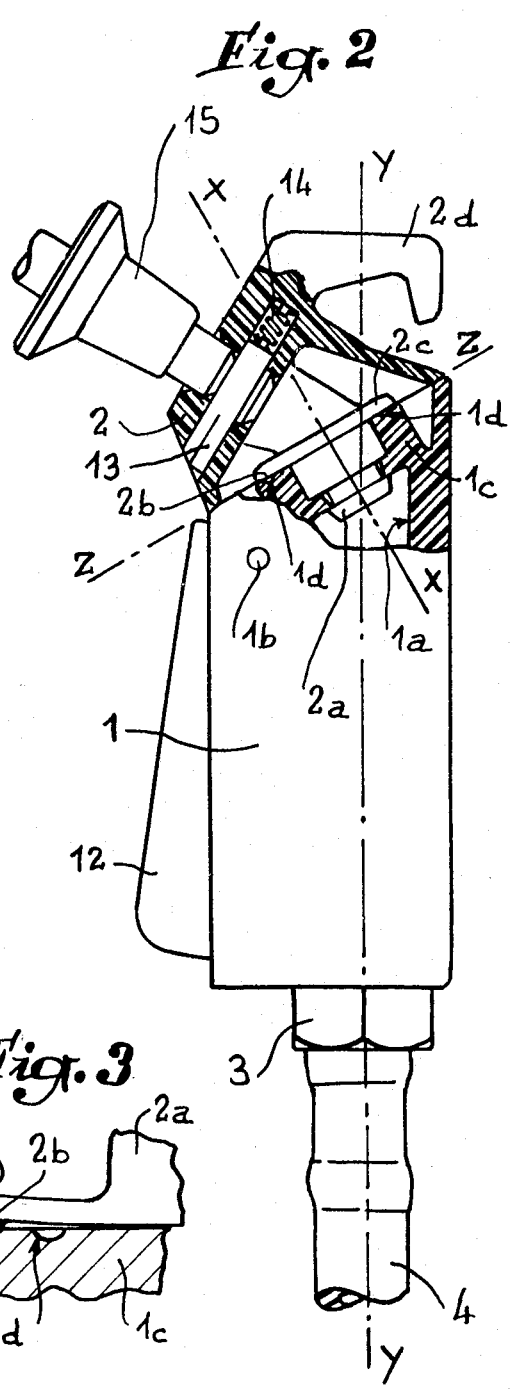

COMPRESSED AIR GUN

The present invention relates to improvements applied to compressed air guns or "blowers" used in particular in mechanical workshops or the like for cleaning parts or for other similar applications.

It is known that blowers generally comprise a body shaped in order to form a handle directly and inside which is mounted a switching control mechanism intended for controlling the jet of air leaving a nozzle integral with said body. Depending on the type of work to be carried out, two main types of blower have been produced, namely so-called "rectilinear" blowers, in which the nozzle is directed axially with respect to the body and so-called "bent" blowers in which said nozzle is directed obliquely with respect to the aforesaid axis. Thus, it frequently happens that it is necessary to provide two supply systems and two blowers for the same workshop.

The improvements which are the object of the present invention, are intended to remedy the aforesaid drawback and to facilitate the production of a gun or blower equipped with a blowing nozzle able to assume at least two different orientations with respect to the axis of the body forming the handle.

According to the invention, the nozzle is supported by a separate member connected to the body by means of a pivot pin arranged obliquely with respect to the axis of the latter, such that the rotation of the aforesaid member modifies the angular orientation of the nozzle.

For the purpose of improving the aesthetic appearance of the apparatus, the opposing sides of the nozzle support member and of the body are given an elliptical profile and are directed perpendicularly to the pivot axis, such that said sides are kept in contact with each other, whatever the orientation of the aforesaid member with respect to the body.

The accompanying drawings, given as an example, will make it easier to understand the invention.

FIG. 1 is an axial sectional view of a gun or blower according to the invention.

FIG. 2 shows the same device with a different angular orientation of the nozzle support member.

FIG. 3 is a detailed sectional view, to a larger scale, illustrating the locking mechanism associated with the nozzle support member.

The blower illustrated in FIGS. 1 and 2 comprises essentially a body 1 and a nozzle support member 2, these parts both being made from synthetic material in the example in question.

The body 1, having a flattened contour for the purpose of forming a handle for the entire device, is provided with an axial bore 1a of circular section. One of the ends of this bore (the lower end in FIGS. 1 and 2) is threaded to receive a conventional mouth-piece 3 intended to secure the flexible supply pipe 4. The mouth-piece 3 positions an annular gasket or seat 5 which bears against a transverse partition 6, itself perforated at its centre. Associated with the seat 5 is a ball 7 urged into a closing position by a spring 8. The opening of the valve or ball 7 against the action of the spring 8 is ensured by a slide 9, having a triangular contour in section to allow the passage of air, whilst being guided inside the bore 1a; this slide is controlled by the ramp 10a of a transverse pushrod 10 urged by a spring 11 and actuated by a lever 12, which is pivoted at 1b inside a lateral housing in the body 1.

It will be understood that the operation of the lever 12 ensures the axial displacement of the slide 9, the pointed end of which, engaged in the central opening in the partition 6 and seat 5, pushes the ball 7, thus causing the passage of compressed air admitted through the pipe 4.

Opposite the mouth-piece 3, the body 1 comprises a part 1c in the form of a socket, the opening of which is disposed on an axis X—X (FIG. 2) inclined obliquely with respect to the general axis Y—Y of said body 1. This socket 1c receives a central cylindrical boss 2a of the member 2, said boss being shaped in order to engage by snapaction at the rear of an annular shoulder of the member 2 with respect to the body 1. The free edge of the socket 1c is provided with a series of depressions 1d (FIG. 3) which co-operate resiliently with projections 2b provided on the opposing side of a shoulder or plate 2c of the central boss 2a. It will be noted that the end walls of the body 1 and of the member 2 which face each other, are advantageously provided with an elliptical profile and are arranged on a plane Z—Z perpendicular to the axis X—X in order that they remain permanently in contact with each other.

The member 2 is laterally integral with a hook 2d (FIGS. 1 and 2) for suspending the blower arrangement. Furthermore, it is equipped with a bolt 13 associated with a spring 14 for locking the profiled tail end of an interchangeable nozzle 15. In the locked position, the end of the tail of the nozzle 15 bears in an air-tight manner against an annular gasket 16 provided inside a bore 2e partly located in the boss 2a and partly in the member 2, which bore is bent in order to open out in the bore 1a of the body 1 and on the front free face of the member 2.

The operation and use of the above-described blower will be easily understood. In FIG. 1, it is assumed that the member 2 was arranged angularly such that the blower nozzle 15 was located in the plane of the axis Y—Y of the body 1, the device thus being able to be used in the manner of a conventional rectilinear blower. When it is desired to modify the orientation of the nozzle 15 to obtain a bent blower, it is sufficient to rotate the member 2 by force with respect to the body 1; owing to the elastic deformability of the plate 2c (FIG. 3), the projections 2b leave the depressions 1d in which they were applied and engage in other depressions with a view to immobilizing the member 2 angularly at the new orientation. Naturally, an appropriate number of depressions 1d and/or projections 2b is provided in order to facilitate the aforesaid angular immobilization at two or more different orientations.

I claim:

1. A compressed air gun for attachment to an air supply line, comprising:
    a body member elongated in the direction of its axis and having a bore extending through the body member and having means for connecting the air supply line with the bore, said body member having an end wall whose external surface lies in a plane disposed at an oblique angle to said axis;
    an air blowing nozzle; and
    a nozzle support member having a bore extending therethrough in the direction of the axis of the support member and having means to receive and support the nozzle in communication with one end of its bore; and the support member having at the other end of its bore an end wall whose external surface lies in a plane disposed at an oblique angle to the axis of the support member;

the central portions of the surfaces of the end walls of said members being provided with mating hollow boss and socket pivot members extending perpendicularly through the central portions of the end walls at which they are respectively located and communicating respectively with the bores of the body and support members, the surfaces around said pivot members lying in contact with each other when the pivot members are mated; and means for maintaining the pivot members mated.

2. The compressed air gun as set forth in claim 1, wherein the body member and the support member and said pivot members are made of a synthetic plastic material, said means for maintaining the pivot members mated comprising mutually-engaging snap-action shoulder means on the pivot members resisting withdrawal of the boss member from the socket member when they are mated.

3. The compressed air gun as set forth in claim 1, including interlocking detent means at the surfaces of the end walls adjacent said pivot members and operative to yieldably lock the nozzle support member in selected positions to which it can be pivoted with respect to said body member.

4. The compressed air gun as set forth in claim 1, wherein the body member and the support member are made of synthetic plastic material, one of said members including detent depressions in its end wall surface adjacent said pivot members, and the other of said members including deformable plate means carrying a projection extending from its end wall surface adjacent said pivot members and yieldably engageable in said detent depressions for certain pivotal positions of the support member with respect to the body member.

5. The compressed air gun as set forth in claim 4, wherein said nozzle is received and supported aligned with the axis of the support member, and wherein the pivot members have an axis which passes through the support member at a point offset from the nozzle on one lateral side of the support member; and a hook member integrally connected with said one lateral side of the support member and opening in a direction away from the nozzle.

* * * * *